Sept. 17, 1946.    N. L. KEARNEY    2,407,958
SNUBBER
Filed March 28, 1936

INVENTOR.
NORMAN L. KEARNEY.
BY
ATTORNEY

Patented Sept. 17, 1946

2,407,958

UNITED STATES PATENT OFFICE 2,407,958

SNUBBER

Norman L. Kearney, Buffalo, N. Y., assignor, by mesne assignments, to Curtiss-Wright Corporation, a corporation of New York Application March 28, 1936, Serial No. 71,514

5 Claims. (Cl. 244—110)

This invention relates to improvements in arresting gears for aircraft, the particular invention being for use with those types of aircraft which are adapted for landing in restricted areas, which areas are equipped with means for engagement by a hook carried by the aircraft.

Aircraft of the character indicated are equipped with what is called an "arresting hook," which consists of a shank pivotally carried by the aircraft toward the rear thereof, the shank having at its lower end a hook for engagement with arresting devices on the landing surface. Means are usually provided for swinging the hook shank in a vertical plane, so that when the craft is in flight, the shank is substantially enclosed in the aircraft and so that, when preparing for a landing, the shank is extended below the body of the aircraft.

An object of this invention is to provide means, in a retractable arresting hook, by which impact shocks incident to impingement of the hook on the landing surface, are absorbed. A related object is to so damp the deflections of the arresting hook upon impact as to prevent such hook from bouncing, by which bouncing it is apt to leave the landing surface after once contacting same, with the possible danger of disengaging the arresting elements on the landing surface.

A further object is to provide resilient means by which the arresting hook is maintained in landing attitude against the air pressure due to the flight of the aircraft.

Figure 1:
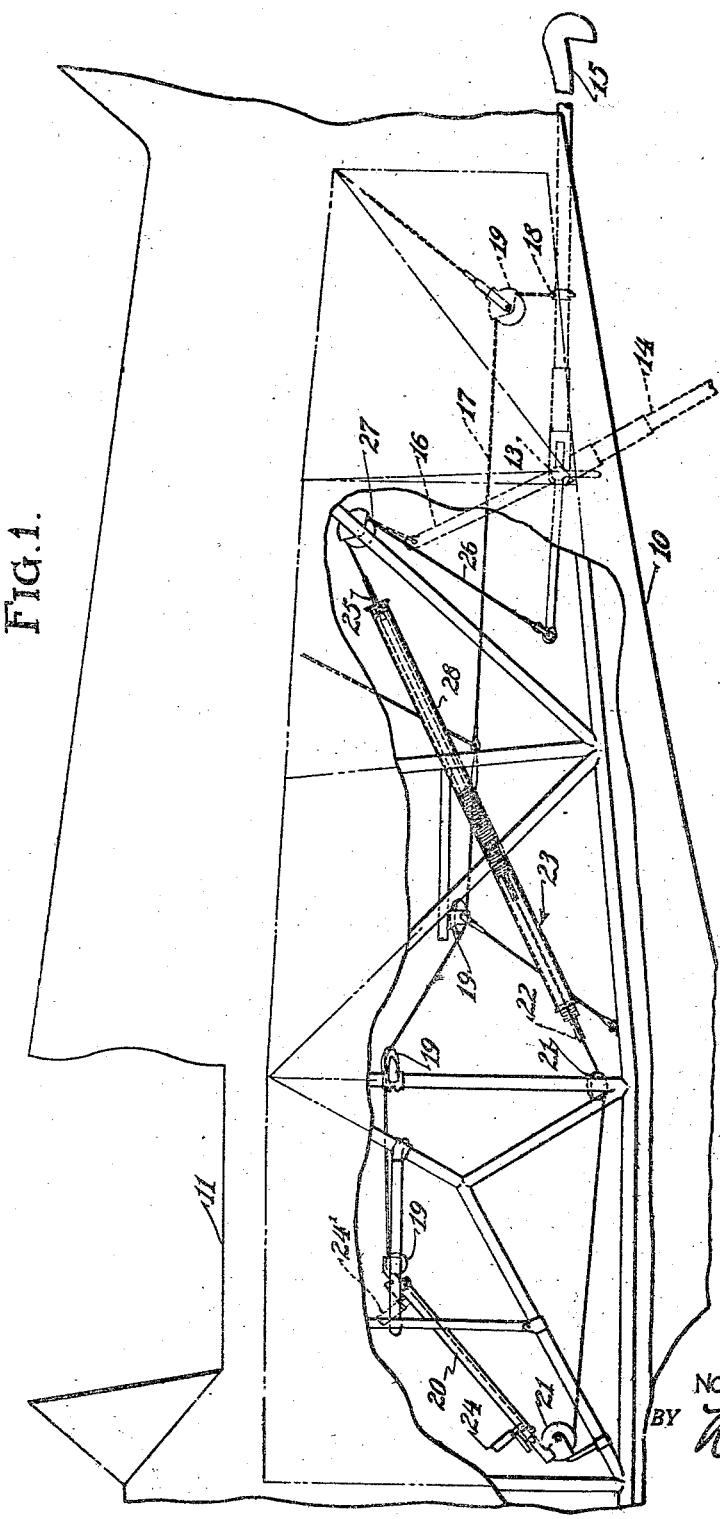
Figure 2:
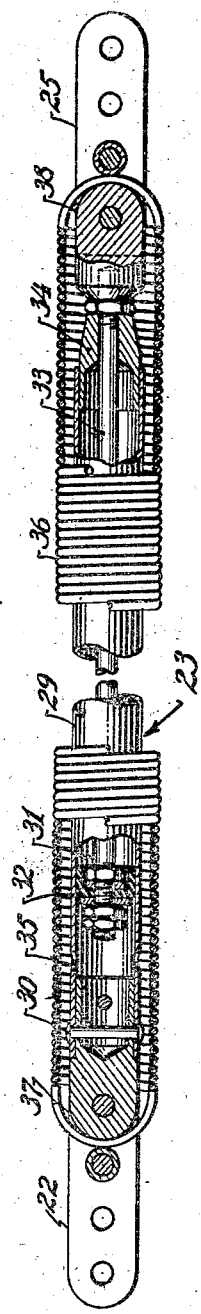

The details of the invention may be better appreciated by referring to the detailed description herewith, and to the annexed drawing, in which:

Fig. 1 is a fragmentary elevation of an aircraft fuselage, partly broken away, to show the arresting gear organization; and Fig. 2 is an enlarged elevation, partly in section, of the shock absorbing device for the arresting gear.

In Fig. 1, I show the rearward portion of an aircraft fuselage 10, having a forwardly located cockpit 11, and comprising the structural framework 12. Toward the rearward portion of the framework 12 a transverse pivot 13 is arranged upon which is journaled an arresting hook shank 14 having a hook 15 at its extreme end. The shank 14 is continued inwardly as at 16 beyond the pivot 13. A cable 17 is shackled to the shank 14 at a point such as 18, spaced exteriorly from the pivot 13. The cable 17 extends over sheaves 19 through a tube 20 in the cockpit 11, and extends from the tube over sheaves 21 to a yoke 22 comprising part of the snubber designated in its entirety as 23. That part of the cable 17 within the tube 20 is provided with a handle 24 which may be traversed through the length of the tube for translating the cable 17, and handle locks are provided at each extreme position. A yoke 25 at the rearward end of the snubber unit 23 is shackled to a cable 26 which passes over a sheave 27 to a shackle at the upper end of the shank extension 16. From the drawing, it will be apparent that when the handle 24 is drawn upwardly and rearwardly, the shank 14 will be moved forwardly and downwardly to a position for landing. When said handle 24 is pushed forwardly and downwardly, the shank 14 is drawn upwardly and rearwardly to a retracted position.

The unit 23 comprises resilient means by which the shank 14 may move rearwardly upon impact thereof with the landing surface, without altering the position of that part of the cable 17 which is attached to the yoke 22. In other words, the cable 26 is tensioned upon landing to stretch the resilient unit 23. To confine said unit 23 to a definite path of translation, it is enclosed in a guide tube 28 fixed to the fuselage skeleton 12.

The resilient unit 23, per se, is shown in Fig. 2, and comprises a cylinder 29 fixed to the yoke 22 by a rivet 30, said yoke forming a closure for the end of said cylinder. Engaging within the bore of said cylinder is a piston 31 having a suitable packing 32 of leather or the like, said piston being carried on a piston rod 33 extending through a guide 34 fixed to the open end of the cylinder 29, said rod being attached as by screwing, to the yoke 25. If desired, orifices 35 may be formed in the cylinder 29 to provide for air bleed.

Encircling the cylinder 29 is a coil spring 36 hooked at its ends to suitable bosses 37 and 38, respectively, on the yokes 22 and 25.

In operation, the unit 23, as a whole, will be translatable with the cables 17 and 26 as the arresting gear is moved between extended and retracted positions. When the arresting hook is extended, the unit 23 will lie forwardly within the tube 28, and the piston 32 will lie well within the cylinder 29. The final locking position of the handle 24 will be so arranged as to stretch the spring 36 a small amount, whereby the hook 14 is resiliently held against the airstream. When a landing is effected, the hook 15 will strike the landing surface, tensioning the cable 26 and extending the piston rod 33 with respect to the cylinder 29, at the same time, stretching the spring 36. The piston 32, in the cylinder 29, forms an air dashpot which will resist any tendency toward bouncing to which the hook 15 may be subject, this dashpot, with the aid of the spring 36, holding the hook 15 in firm contact with the landing surface regardless of momentary changes in the attitude of the aircraft with respect to the landing surface. As the aircraft settles to the landing surface, the spring 36 will be still further stretched as the hook is moved upwards by the weight of the aircraft to a position intermediate the extended and retracted positions. Thereupon, the aircraft operator may unlock the handle 24 in the tube 20, moving it from the upper rearward position indicated at 24' to the lower forward position, whereby the arresting hook will be fully retracted and the aircraft can then proceed over the landing surface with the conventional landing gear, which is not shown, as such landing gears are common to all aircraft.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. A tension hold-down device for an aircraft arresting hook including a cable circuit for raising and lowering said hook, comprising a cylinder and a piston having a rod engaged for sliding therein, said cylinder and piston rod respectively being attached in series in said cable, said piston and cylinder together forming a dashpot, and a tension coil spring embracing said cylinder and attached at its ends to said cylinder and said rod respectively.

2. In an arresting gear, in combination, a hook shank pivoted to said aircraft, a cable shackled at its ends to said shank at substantially equal distances on each side of said pivot, operating means for translating said cable to raise and lower said shank, and damped tension means in series with said cable for holding said cable taut and for damping bouncing of said shank upon the hook striking a landing surface.

3. In a snubber of the character described, a cylinder closed at one end, a piston rod passing into the cylinder open end having a piston engaging the cylinder wall, a coiled tension spring encircling said cylinder, attached at its ends adjacent the closed end of said cylinder and the anti-piston end of said rod, respectively, and a fixed guide tube embracing said spring, within which tube said snubber is bodily axially movable.

4. In a retractable arresting gear, in combination, a hook shank pivoted to said aircraft and extending on both sides of the pivot, a cable shackled to said shank at its ends, respectively on opposite sides of said pivot, means to translate said cable, and damped tension means in series with said cable for holding said cable taut and for damping bouncing of said shank upon the hook striking a landing surface.

5. In a retractable arresting gear, in combination, a hook shank pivoted to said aircraft, a cable shackled at its ends to said shank, means for translating said cable for raising and lowering the shank, and damped tension means in series with said cable for holding said cable taut and for damping bouncing of said shank upon the hook striking a landing surface.

NORMAN L. KEARNEY.